US006380323B1

(12) United States Patent
December

(10) Patent No.: US 6,380,323 B1
(45) Date of Patent: Apr. 30, 2002

(54) ELECTROCOAT RESIN COMPOSITIONS CONTAINING CARBAMATE FUNCTIONAL RESINS HAVING ONE OR MORE QUATERNARY AMMONIUM GROUPS AND AT LEAST ONE CARBAMATE FUNCTIONAL REACTIVE ADDITIVE

(75) Inventor: Timothy S. December, Rochester, MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/464,431

(22) Filed: Dec. 15, 1999

(51) Int. Cl.$^7$ .................. C08F 283/10; C08G 59/14; C08G 65/326

(52) U.S. Cl. .................. 525/452; 525/484; 526/273; 528/99; 560/159

(58) Field of Search ............... 525/452, 484; 528/99; 560/159; 526/273

(56) References Cited

U.S. PATENT DOCUMENTS

| | | | |
|---|---|---|---|
| 2,979,514 A | | 4/1961 | O'Brien et al. .......... 260/340.2 |
| 3,479,328 A | | 11/1969 | Nordstrom ................. 260/86.1 |
| 3,639,657 A | | 2/1972 | Moran et al. |
| 3,661,966 A | * | 5/1972 | Bartmann et al. .......... 560/159 |
| 3,674,838 A | | 7/1972 | Nordstrom .................. 260/482 |
| 4,126,747 A | | 11/1978 | Cowherd, III et al. |
| 4,279,833 A | | 7/1981 | Culbertson et al. |
| 4,340,497 A | | 7/1982 | Knopf |
| 4,408,026 A | * | 10/1983 | Pusineri et al. ......... 525/452 X |
| 4,484,994 A | | 11/1984 | Jacobs, III et al. ......... 204/181 |
| 4,501,833 A | | 2/1985 | Bosso et al. |
| 4,501,874 A | * | 2/1985 | Hanafin .................... 525/484 X |
| 4,520,167 A | | 5/1985 | Blank et al. ................ 525/131 |
| 4,588,783 A | * | 5/1986 | Chang .................... 525/533 X |
| 4,758,632 A | | 7/1988 | Parekh et al. ................ 525/383 |
| 4,814,382 A | | 3/1989 | Hoy et al. |
| 4,897,435 A | * | 1/1990 | Jacobs, III et al. ....... 528/99 X |
| 4,977,231 A | | 12/1990 | McVay et al. |
| 5,057,557 A | * | 10/1991 | Treybig et al. ......... 525/484 X |
| 5,075,386 A | | 12/1991 | Vanderbilt |
| 5,115,015 A | | 5/1992 | Richey, Jr. et al. .......... 524/507 |
| 5,128,408 A | * | 7/1992 | Tanaka et al. .......... 525/452 X |
| 5,134,205 A | * | 7/1992 | Blank .................... 525/452 X |
| 5,158,808 A | | 10/1992 | Hoy et al. |
| 5,336,566 A | | 8/1994 | Rehfuss |
| 5,356,669 A | | 10/1994 | Rehfuss et al. |
| 5,431,791 A | | 7/1995 | December et al. |
| 5,512,639 A | | 4/1996 | Rehfuss et al. |
| 5,527,614 A | | 6/1996 | Carpenter et al. |
| 5,552,497 A | | 9/1996 | Taylor et al. |
| 5,559,195 A | | 9/1996 | McGee et al. |
| 5,576,063 A | | 11/1996 | Briggs et al. |
| 5,593,733 A | | 1/1997 | Mayo |
| 5,639,828 A | * | 6/1997 | Briggs et al. ............ 525/533 X |

(List continued on next page.)

FOREIGN PATENT DOCUMENTS

| | | | |
|---|---|---|---|
| CA | 1295767 | 2/1992 | ............ C09D/7/12 |
| DE | 198 24 656 A1 | 12/1998 | ......... C07C/271/18 |
| EP | WO 87/00851 | 2/1987 | ............ C09D/7/12 |
| EP | WO 88/02766 | 4/1988 | ............ C08D/7/00 |
| EP | 0 440 583 A2 | 1/1991 | ........... C08G/59/54 |
| EP | 0 680 988 A | 11/1995 | ........... C08G/71/00 |
| EP | 0767 226 A | 4/1997 | ......... C09D/201/00 |
| EP | 0 780 455 A | 6/1997 | ......... C09D/201/06 |
| EP | 0 889 101 A2 | 1/1999 | ............ C09D/5/44 |
| EP | WO 99/33915 | 7/1999 | ........... C08L/33/14 |
| EP | WO 00 37572 A | 6/2000 | ............ C09D/5/44 |
| EP | WO 00 37573 A | 6/2000 | ............ C09D/5/44 |

OTHER PUBLICATIONS

International Search Report for PCT/US 00/27598.
International Search Report for PCT/US 00/28047.
International Search Report for PCT/US 00/27128.
International Search Report for PCT/US 00/28034.
08/333,804, Filed Nov. 3, 1994, Walter Ohrbom, Curable coating compositions containing carbamate resin Additives.
Timothy December, "Cathodic electrocoat composition having latent functionality", Sep. 30, 1997, pp. 1–37, US Serial No. 09/941,561.
Timothy December, "Coating composition containing a compound with latent functionality", Sep. 30, 1997, pp. 1–29, US Serial No. 09/941,131.
Timothy December, Curable coating composition contains a resin with latent functionality, AT Sep. 30, 1997, pp. 1–33, US Serial No. 941,562.
Marcia Agostinho & Vincent Brytus, "A high solids one–component, low temperature bake epoxy coatings," J. Coating Tech., Sep. 1988, at apge 61.

Primary Examiner—Richard D. Lovering
(74) Attorney, Agent, or Firm—Mary E. Golata

(57) ABSTRACT

The invention provides a resin composition comprising (A) a polymer comprising at least 1 primary carbamate functional group and 1 or more quaternary ammonium groups, and (B) a carbamate functional reactive additive that is generated in situ during the production of polymer (A). The invention also provides a method of making an electrocoat resin composition comprising (A) and (B), the method comprising reacting a monomeric polyisocyanate and a compound having at least 1 group that is reactive with isocyanate and at least 1 carbamate group, to produce both (1) an intermediate product having at least 1 carbamate functional group and at least 1 isocyanate functional group, as well as (2) a carbamate functional reactive additive having no isocyanate functionality, reacting said intermediate product with a compound having at least 1 epoxy group and at least 1 isocyanate reactive group, said reaction occurring in the presence of the reactive additive to produce a carbamate functional resin having at least 1 epoxy group, reacting said at least 1 epoxy group with a tertiary amine in the presence of an acid to provide a carbamate functional resin having 1 or more quaternary ammonium groups, said reaction occurring in the presence of the reactive additive.

21 Claims, No Drawings

U.S. PATENT DOCUMENTS

| | | |
|---|---|---|
| 5,646,214 A | 7/1997 | Mayo |
| 5,659,003 A | 8/1997 | Menovcik et al. |
| 5,693,723 A | 12/1997 | Green |
| 5,693,724 A | 12/1997 | Green |
| 5,714,549 A | 2/1998 | Wu et al. |
| 5,719,237 A | 2/1998 | Rehfuss et al. |
| 5,723,552 A | 3/1998 | Menovcik et al. |
| 5,726,246 A | 3/1998 | Rehfuss et al. |
| 5,726,254 A | 3/1998 | Wu et al. |
| 5,744,550 A | 4/1998 | Menovcik et al. |
| 5,766,769 A | 6/1998 | Ohrborn et al. |
| 5,827,931 A | 10/1998 | Menovcik et al. |
| 5,854,385 A * | 12/1998 | McGee et al. .......... 525/452 X |
| 5,866,259 A | 2/1999 | Harris et al. ............. 428/424.4 |
| 5,872,195 A | 2/1999 | Green et al. ................ 525/481 |

* cited by examiner

ELECTROCOAT RESIN COMPOSITIONS CONTAINING CARBAMATE FUNCTIONAL RESINS HAVING ONE OR MORE QUATERNARY AMMONIUM GROUPS AND AT LEAST ONE CARBAMATE FUNCTIONAL REACTIVE ADDITIVE

FIELD OF THE INVENTION

The present invention relates to coating compositions for use in cathodic electrodeposition coating processes and methods of cathodic electrodeposition. More particularly, the invention provides resins for electrocoat coating compositions which contain a carbamate functional polymer (A) having one or more quaternary ammonium groups and a carbamate functional reactive additive (B) which is generated in situ during the preparation of said carbamate functional resin.

BACKGROUND OF THE INVENTION

Coating compositions are widely in use today which utilize a variety of cure mechanisms. Among these are anodic and cathodic electrodeposition coating compositions and methods wherein a film-forming composition is deposited on a substrate under the influence of an applied electric potential. "Electrodeposition" as used herein refers to electrophoretic deposition. "Electrocoat" as used herein refers to both coating compositions used in electrophoretic deposition processes and to coating films obtained from electrophoretic deposition processes.

During electrodeposition, an ionically-charged polymer having a relatively low molecular weight is deposited onto a conductive substrate by submerging the substrate in an electrocoat bath having dispersed therein the charged resin, and applying an electrical potential between the substrate and a pole of opposite charge, usually a stainless steel electrode. This produces a relatively soft coating of low molecular weight on the substrate. This coating is usually converted to a hard high molecular weight coating by curing or crosslinking of the resin, usually upon exposure to elevated temperatures. In cathodic electrocoat, the workpiece being coated serves as the cathode.

One curing mechanism for prior art electrocoat compositions utilizes a melamine formaldehyde polymer-curing agent in the electrodepositable coating composition to react with hydroxyl functional groups on the electrodeposited resin. This curing method provides good cure at relatively low temperatures (e.g., 132° C.), but the crosslinked bonds contain undesirable ether linkages and the resulting coatings provide poor overall corrosion resistance.

For example, U.S. Pat. No. 4,501,833 discloses aminoplast curable cationic coating compositions that contain an onium salt-group containing polymer and a specific aminoplast curing agent. However, the performance of the cured coating is believed to be less than that desired by current commercial conditions.

In order to address some of the problems with melamine-crosslinked electrocoats, many users employ polyisocyanate crosslinkers to react with hydroxyl functional groups on the electrodeposited resin. This curing method provides desirable urethane crosslink bonds, but it also entails several disadvantages. In order to prevent premature gelation of the electrodepositable coating composition, the highly reactive isocyanate groups on the curing agent must be blocked (e.g., with an oxime, lactam, or alcohol).

Blocked polyisocyanates, however, require high temperatures (e.g., 176° C. or more) to unblock and begin the curing reaction. The resulting electrocoats can also be susceptible to yellowing. Moreover, the volatile blocking agents released during cure can cause other deleterious effects on various coating properties, as well as increasing VOC.

In addition, use of some the volatile blocking agents may give rise to environmental concerns. Finally, the volatile blocking agents account for significant and disadvantageous weight loss upon crosslinking.

In addition to the foregoing problems, prior art electrocoat compositions have sometimes lacked good flow at a particular dip viscosity and solids. It is thus desirable to obtain an electrocoat coating composition which would is free of the foregoing problems but also exhibits good flow at a particular dip viscosity and desirably high solids. It would also be advantageous to obtain such improvements with the aid of a component which resulted in advantageous urethane linkages upon crosslinking, rather than undesirable ether linkages.

Finally, it is desirable to obtain electrocoat resin compositions, especially cationic resin compositions, which will satisfy the above concerns but which are also cost effective and commercially manufacturable.

There is thus a need in the art for electrodepositable coating compositions that can provide desirable urethane crosslink linkages, but avoid the problems of the prior art, especially those resulting from the use of blocked polyisocyanate curing agents. In particular, it is desirable to provide a cathodic electrodeposition coating composition capable of providing urethane linkages at low bake temperatures of 121° C. or less with decreased weight loss upon crosslinking, while being free of isocyanates and the volatile blocking agents used with isocyanates.

SUMMARY OF THE INVENTION

The foregoing objects have unexpectedly been obtained with the use of an electrocoat resin composition comprising a carbamate functional polymer (A) having one or more quaternary ammonium groups and a carbamate functional reactive additive (B) obtained during and as a result of the production of said carbamate functional resin (A). The invention provides advantages in performance, cost and efficiency.

The invention also provides a method of making a electrocoat resin composition comprising (A) a polymer having at least one primary carbamate group and one or more quaternary ammonium groups and (B) a carbamate functional reactive additive, the method comprising reacting a monomeric polyisocyanate, and a compound comprising at least one group that is reactive with isocyanate and at least one carbamate group, so as to produce both (1) an intermediate product having at least one carbamate functional group and at least one isocyanate functional group, as well as (2) a carbamate functional reactive additive having no isocyanate functionality, reacting said intermediate product with a compound having at least one epoxy group and at least one isocyanate reactive group, said reaction occurring in the presence of the reactive additive so as to produce a carbamate functional resin having at least one epoxy group, reacting said at least one epoxy group with a tertiary amine compound in the presence of an acid to provide a carbamate functional resin having one or more quaternary ammonium groups, said reaction occurring in the presence of the reactive additive to provide a resin composition comprising (A) a carbamate functional resin having one or more quaternary ammonium groups and (B) a carbamate functional reactive additive.

Finally, the invention provides electrocoat coating compositions comprising the resin composition of the invention and a method of using said electrocoat coating compositions.

DETAILED DESCRIPTION OF THE INVENTION

The polymer (A) of the invention will have at least one primary carbamate group appended to a polymer backbone, preferably a plurality of pendant carbamate functional groups. In addition, the polymer (A) must further comprise one or more quaternary ammonium groups.

As used herein, "primary carbamate group" refers to the functional group having the structure

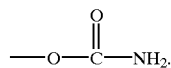

Thus, the primary carbamate group of the invention may be defined as a terminal or pendent carbamate group.

The carbamate functional polymer (A) may be prepared in a variety of ways.

One way to prepare such polymers is to prepare an acrylic monomer having carbamate functionality in the ester portion of the monomer. Such monomers are well known in the art and are described, for example in U.S. Pat. Nos. 3,479,328, 3,674,838, 4,126,747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on hydroxyalkyl carbamate is then esterified by reaction with acrylic or methacrylic acid to form monomer.

Other methods of preparing carbamate-modified acrylic monomers are described in the, art, and can be utilized as well to prepare carbamate functional acrylic polymers.

Alternatively, and in a most preferred reaction scheme, a carbamate functional intermediate adduct (A') may be made from the reaction of a polyisocyanate (ai) and a carbamate functional compound (aii) comprising at least one group which is reactive with isocyanate. Preferably, the compound (aii) will comprise at least one, primary carbamate group.

Suitable polyisocyanates (ai) are monomeric polyisocyaflates that can be aliphatic, cycloaliphatic, and/or aromatic polyisocyanates. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis-(cyclohexyl isocyanate) and isophorone diisocyanate. Useful aromatic diisocyanates and araliphatic diisocyanates include the various isomers of toluene diisocyanate, meta-xylylenediioscyanate and para-xylylenediisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used. In addition, the various isomers of α,α,α',α'-tetramethyl xylene diisocyanate can be used. Biurets of isocyanates such as DESMO-DUR® N100 from ay also be useful. Preferably, polyisocyanate (ai) is a diisocyanate. Isophorone diisocyanate is most preferred.

Suitable examples of such isocyanate reactive, carbamate functional compounds are commercially available hydroxy functional carbamate compounds such as hydroxypropyl carbamate, hydroxybutyl carbamate, and mixtures thereof. Hydroxypropyl carbamate is most preferred. It is also within the scope of the invention to use isocyanate reactive compounds containing groups convertible to carbamate in place of the isocyanate reactive, carbamate functional compounds. Use of the term "convertible to carbamate" refers to groups which have the capability of forming carbamate groups, preferably primary carbamate groups after reaction with the polyisocyanate is completed. Examples of groups convertible to carbamate include cyclic carbonate groups, (i.e., the reaction product of glycidol and $CO_2$ then reacted with ammonia to form a carbamate group), and epoxy groups (i.e., reaction of the epoxy with $CO_2$ to form cyclic carbonate followed by reaction with ammonia).

The isocyanate reactive, carbamate functional compound (aii) is reacted with the polyisocyanate (ai) to provide an intermediate compound (A') having at least one carbamate group, preferably at least one primary carbamate group, and at least one isocyanate group.

In a preferred embodiment, the isocyanate reactive carbamate functional compound (aii) will be reacted with the polyisocyanate (ai) under reaction conditions sufficient to produce both the intermediate (A') having both carbamate functionality and isocyanate functionality as well as a carbamate functional reactive additive (B) which is free of isocyanate functionality. In this embodiment, both (B) and (A') are the reaction products of a single reaction. Accordingly, (B) may be described as being generated "in situ" during the production of intermediate (A'). Examples of suitable reaction conditions include a mole equivalent ratio of NCO to hydroxyl of from 2/1 to 2/2, preferably from 1.2 to 1.8, and most preferably from 1.3 to 1.7. Other reaction conditions to consider include temperature and catalyst type and level.

Suitable catalysts which may be used for the production of the polymer (A) include those described below with respect to the coating composition of the invention. Preferred catalysts are those such as Lewis acids or zinc salts. A most preferred catalyst is dibutyl tin dilaurate. Preferably, the catalyst will be used in an amount of from 0.1 to 5%, and most preferably from 0.5 to 1.5%, based on solids.

Reactive additive (B) will have a number average molecular weight of from 250 to 2000 and most preferably from 400 to 800. Preferably, reactive additive (B) will have a degree of carbamate functionality equal to the degree of isocyanate functionality of polyisocyanate (ai), i.e., the polyisocyanate (ai) will preferably be one half blocked for the reactive additive (B).

The carbamate functional/isocyanate functional intermediate (A') is then grafted onto an acrylic, epoxy or other hydroxy functional resin (A") having suitable characteristics for use. The grafting of the intermediate (A') must occur via reaction with the at least one isocyanate group of (A') with a reactive group of (A").

Most preferably, the carbamate functional/isocyanate functional intermediate (A') will be grafted onto a hydroxy functional compound comprising epoxy groups. The grafting of (A') will thus occur via reaction between a hydroxyl group and the at least one isocyanate group of (A'). Preferably, the hydroxy functional compound comprising epoxy groups will be an epoxy functional resin. As discussed below, reaction of the epoxy group with a tertiary amine in the presence of an acid is a preferred method of incorporating the required one or more quaternary ammonium groups.

Suitable epoxy containing polymers are resinous polyepoxide or polymeric resinous materials containing two or more 1,2-epoxy groups per molecule. Preferred polyepoxides are polyglycidyl ethers of polyhydric phenols such as bisphenol A. These can be produced by etherification of a polyphenol with an epihalohydrin or dihalohydrin such as epichlorohydrin or dichlorohydrin in the presence of alkali. Suitable polyhydric phenols include bis-2,2-(4-hydroxyphenyl)propane, bis-1,1-(4-hydroxyphenyl)ethane, bis(2-hydroxynaphthyl)methane and the like.

Other useful polyepoxide compounds are those made from novolak resins or similar polyhydroxyphenol resins.

Also suitable are polyglycidyl ethers of polyhydric alcohols such as ethylene glycol, propylene glycol, diethylene glycol and triethylene glycol.

There can also be used polyglycidyl esters of polycarboxylic acids which are produced by the reaction of epichlorohydrin or a similar epoxy compound with an aliphatic or aromatic polycarboxylic acid such as succinic acid and terephthalic acid.

Most preferably, the epoxy-containing compound to which the carbamate functional intermediate is grafted onto will be the reaction product of a liquid epoxy such as diglycidyl ether of bisphenol A (DGEBA) and bisphenol A. Particularly preferred examples of such epoxy containing compounds may be characterized as upgraded epoxy resins having epoxy equivalent weights of approximately 1100. Suitable liquid epoxys are GY2600, commercially available from Ciba Geigy and Epon® 828, commercially available from Shell Chemical Company.

Thus, the resin composition of the invention comprises both polymer (A) and the carbamate functional reactive additive (B) generated during the production of polymer (A), most specifically during the production of intermediate (A'). Reactive additive (B) will be present in the resin composition of the invention in an amount of from 1 to 20, preferably from 2 to 15 and most preferably from 3 to 10 percent, based on the total resin solids. The resin composition comprising both polymer (A) and polycarbamate functional reactive additive (B) that is free of isocyanate functionality has been found to provide unexpected benefits in both application and performance.

In general, the one or more quaternary ammonium groups of polymer (A) serve as cationic salting sites. As used herein, the term "cationic salting site" refers to a functional group which is sufficiently basic to undergo reaction with an acid to produce a salt, which, while in an aqueous dispersion in the presence of a voltage, will undergo decomposition and facilitate the formation of a insoluble polymer which deposits on a substrate immersed in the aqueous dispersion. While it necessary that polymer (A) comprise one or more quaternary ammonium groups, other cationic salting groups may also be present in polymer (A). Examples of other suitable cationic salting groups are amine functional groups such as primary, secondary, tertiary amino groups or mixtures thereof.

Polymer (A) may be further characterized by a meq of cationic salting group, preferably a quaternary ammonium group, of from about 0.1 to 2.0 meq N/gram polymer (A), preferably from about 0.2 to 1.5 meq N/gram polymer (A), and most preferably from about 0.3 to 0.6 meq N/gram polymer (A). It is preferred that at least 80% of the total number of cationic salting groups be quaternary ammonium groups, more preferably from 90 to 100% of the total number of cationic salting groups, and most preferably from 95 to 100% of the total number. The remaining cationic salting groups can be as described above, with secondary amino groups being most preferred.

A preferred method of incorporating the necessary cationic salting group, i.e., a quaternary ammonium group into the polymer (A), is by reaction of a glycidyl group with one or acid salts of one or more tertiary amines. The acid salt will preferably be preformed via the mixing of one or more tertiary amines and one or more acids. Other amines or polyamines may be used having primary, secondary, tertiary amine groups, or mixtures thereof. However, it will be appreciated that quaternary ammonium groups are a necessary element of polymer (A).

Suitable acids are carboxylic acids such as lactic acid and acetic acid.

Epoxy functionality will most preferably be present in polymer (A) as a result of the foregoing reaction scheme wherein an isocyanate/carbamate functional intermediate (A') is grafted onto a hydroxy/epoxy functional compound.

Alternatively, epoxy functionality can be incorporated into an acrylic resin via the polymerization of a monomer such as glycidyl methacrylate with an ethylenically unsaturated carbamate functional monomer to produce a carbamate functional acrylic having pendent glycidyl functionality. Subsequently, a cationic salting site, i.e., a quaternary ammonium compound can be incorporated by reaction of a tertiary amine with the oxirane group in the presence of an acid.

In the absence of an epoxy group, the cationic salting site can be incorporated into or grafted to the polymer backbone in a variety of ways.

For example, a carbamate functional acrylic monomer can be copolymerized with an ethylenically unsaturated monomer having at least one cationic salting group. One or more carbamate functional monomers such as 2-carbamate ethyl methyacrylate (CEMA) may be copolymerized with at least one ethylenically unsaturated amine functional compound, at least one alkyl ester of an unsaturated organic acid and at least one other ethylenically unsaturated monomer such as styrene in the presence of a suitable initiator such as an azo or peroxide initiator.

Other suitable carbamate functional monomers include those discussed above.

The cationic salting group of the ethylenically unsaturated monomer may be a primary, secondary, or tertiary amine functional group, or a quaternary ammonium salt, or a mixture thereof. Most preferably, the salting group will be a quaternary ammonium salt. Illustrative suitable unsaturated amine functional compounds are methacrylamide, acrylamide, dimethylaminoethyl methacrylate, mixtures thereof, and the like. A preferred unsaturated amine functional compound is dimethylaminoetbyl methacrylate.

Examples of suitable alkyl esters of unsaturated organic acid include ethyl acrylate, butyl acrylate, 2-ethylhexyl acrylate, butyl methacrylate, isodecyl methacrylate, hydroxyethyl methacrylate, hydroxypropyl methacrylate, and the like. Preferred alkyl esters are nonhydroxy functional monomers such as butyl acrylate and butylmethacrylate. A preferred monomer for use as an additional ethylenically unsaturated monomer is styrene.

A preferred example of a suitable ethylenically unsaturated monomer having amino functionality is the reaction product of glycidyl methacrylate and the acid salt of a tertiary amine. Dimethylaminoethyl methacrylate is most preferred as the tertiary amine.

The polymer component (A) will thus generally comprise at least one repeat unit of the formula:

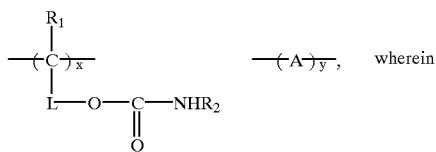

In the above formula, $R_1$ represents H or $CH_3$. R2 represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, A represents at least one repeat unit having a quaternary ammonium group. As discussed above, the at least one cationic salting group may derive from the use of at least one ethylenically unsaturated monomer having at tertiary amino group. Alternatively, and most preferably, the at least one repeating unit having a pendent cationic salting site may derive from the reaction of an tertiary amine functional compound with a glycidyl group previously incorporated into the polymer.

L-represents a divalent linking group, preferably an aliphatic of 1 to 8 carbon atoms, cycloaliphatic, or aromatic linking group of 6 to 10 carbon atoms. Examples of L include

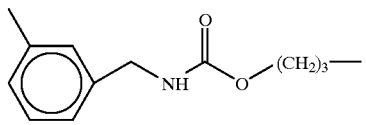

—$(CH_2)$—, —$(CH_2)_2$—, —$(CH_2)_4$—, and the like. In one preferred embodiment, —L— is represented by —COO—L'— where L' is a divalent linking group. L' may be a divalent aliphatic linking group, preferably of 1 to 8 carbon atoms, e.g., —$(CH_2)$—, —$(CH_2)_2$—, —$(CH_2)_4$—, and the like, or a divalen cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group.

The polymer (A) will generally have a weight average molecular weight of 2000–100,000, more preferably more than 2000 to 80,000 and most preferably from 3,000 to 30,000 Molecular weight can be determined by the GPC method using a polystyrene standard.

The glass transition temperature, $T_g$, of components (A), (B) and (C) can be adjusted to achieve a cured coating having the $T_g$ for the particular application involved. The average $T_g$ of unreacted components (A), (B) and (C) should be between 0° C. and 100° C., with the individual $T_g$'s being adjusted to achieve optimum performance.

Polymer (A) should also have a carbamate equivalent weight (CEW) (grams of polymer (A)+ grams of in situ generated reactive additive-(3)/equivalent of carbamate) of from 150 to 1200, preferably from 300 to 1100, and most preferably from 390 to 1000. Polymer (A) without reactive additive (B) will generally have a carbamate equivalent weight of from 150 to 1500, preferably from 600 to 1400, and most preferably from 800 to 1300, (grams of polymer (A)/equivalent of carbamate).

It will appreciated that the various monomers and/or reactants used to make polymer (A) will be used in amounts necessary to obtain the meq N, Tg, weight average molecular weight and carbamate equivalent weight.

The cathodic coating composition of the invention also comprises a curing agent (C). Curing agent (C) is a compound having a plurality of functional groups that are reactive with the carbamate groups on component (A). Such reactive groups include active methylol or methylalkoxy groups on aminoplast crosslinking agents or on other compounds such as phenol/formaldehyde adducts, isocyanate groups, siloxane groups, cyclic carbonate groups, and anhydride groups. Examples of (C) compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), benzoguanamine resins, glycol uril formaldehyde resins, polyanhydrides (e.g., polysuccinic anhydride), and polysiloxanes (e.g., trimethoxy siloxane). Aminoplast resin such as melamine formaldehyde resin or urea formaldehyde resin are especially preferred.

Polymer (A) when salted with an acid is water-dispersible and is useful in electrodeposition processes, especially when incorporated into an emulsion or dispersion. The aqueous dispersion of polymer (A) should be neutralized to a degree sufficient to (i) form an emulsion micelle of less than 0.50 μm, preferably less than 0.20 μm, and (ii) provide emulsion stability in the electrocoat deposition bath.

Electrodepositable coating compositions are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.05 to 5.0 microns, preferably less than 2.0 microns.

The concentration of the polymer (A) in the aqueous medium is, in general, not critical, but ordinarily the major portion of the aqueous dispersion is water. The aqueous dispersion usually contains from about 3 to 50 percent, preferably 10 to 40 percent by weight resin solids. Aqueous resin concentrates which are to be further diluted with water, generally range from 10 to 30 percent by total weight solids.

Polymer (A) is preferably reacted or "salted" with an acid for use in the cathodic electrocoat coating composition of the invention. This reaction may be termed "neutralization" or "acid-salted" and specifically refers to the reaction of the pendent amino groups with an acidic compound in an amount sufficient to neutralize enough of the basic amino groups to impart water-dispersibility to polymer (A). Illustrative acid compounds include phosphoric acid, propionic acid, acetic acid, lactic acid, formic acid, or citric acid. Latic acid is preferred.

The coating composition of the invention can further contain catalysts to facilitate the reaction between polymer (A) and curing agent (C). For example, a strong acid catalyst may be utilized to enhance the cure reaction. It will be appreciated that such catalysts may be blocked or unblocked. Such catalysts are well known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts useful in the composition of the invention include Lewis acids, zinc salts, and tin salts. Illustrative Lewis acids or zinc salts are zinc nitrate, zinc acetate, bismuth octoate, dibutyltin dilaurate, and the like. Such catalysts will typically be used in an amount of from 0.1 to 3.0 weight percent, based on the resin solids, preferably from 0.5 to 2.0 weight percent, based on the resin solids. A most preferred catalyst for use in the coating composition of the invention is zinc nitrate.

Besides water, the aqueous medium of an electrocoat composition may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene, ethylene glycol butyl ether, ethyleneglycol dimethyl ether, or mixtures thereof. A small amount of a water-immiscible organic solvent such as xylene, toluene, methyl isobutyl ketone or 2-ethylhexanol may be added to the mixture of water and the water-miscible organic solvent. The amount of coalescing solvent is not unduly critical and is generally between about 0 to 15 percent by weight, preferably about 0.5 to 5 percent by weight based on total weight of the resin solids.

Electrodeposition coating compositions may further contain conventional pigments such as titanium dioxide, ferric oxide, carbon black, aluminum silicate, precipitated barium sulfate, aluminum phosphomolybdate, strontium chromate, basic lead silicate or lead chromate. The pigment-to-resin weight ratio can be important and should be preferably less than 50:100, more preferably less than 40:100, and usually about 10 to 30:100. Higher pigment-to-resin solids weight ratios have also been found to adversely affect coalescence, flow, and/or coating performance.

Electrodeposition coating compositions can contain optional ingredients such as wetting agents, surfactants, defoamers, antioxidants, UV absorbers, light stabilizers, and so forth. Examples of surfactants and wetting agents include alkyl imidazolines such as those available from Ciba-Geigy Industrial Chemicals as Amine C®, acetylenic alcohols available from Air Products and Chemicals as Surfynol® 104. These optional ingredients, when present, constitute from about 0 to 20 percent by weight of resin solids, and preferably from 0.1 to 1.0 percent by weight of resin solids. Plasticizers are optional ingredients because they promote flow. Examples are high boiling water immiscible materials such as polyalkylene polyols, such as polypropylene polyols or ethylene or propylene oxide adducts of nonyl phenols or bisphenol A. Plasticizers can be used and if so are usually used at levels of about 0 to 15 percent by weight resin solids.

In general, sufficient water is added so that the dispersion has a solids content of more than 20, preferably more than 30% by weight.

The electrodeposition coating composition should have an electroconductivity from 0.1 to 5 mS/cm, preferably from 0.5 to 3 mS/cm. When this value is too low, it is difficult to obtain a film thickness having desired protective and other functions. Conversely, if the composition is too conductive, problems such as the dissolution of substrate or counter electrode in the bath, uneven film thickness or poor water or corrosion resistance may arise.

Electrodeposition coating compositions may be applied on a conductive substrate by the electrodeposition coating process at a nonvolatile content of 10 to 25% by weight to a dry film thickness of 15 to 35 microns. After application, the coating may be cured at an elevated temperature, depending upon the nature of particular base resins. Prior art cathodic electrodeposition coating typically cure at approximately 20 minutes at 350° F. (metal temperature). The cathodic electrodeposition coating compositions of the invention cure at 20 minutes at 310° F. or less (metal temperature), preferably at 20 minutes at 260° F. (metal temperature), most preferably 20 minutes at 200° F. (metal temperature).

The cathodic electrodeposition coatings of the invention are advantageous in that % weight loss upon crosslinking is less than 15%, preferably less than 10% and most preferably from 6 to 8%, based on the total weight of applied coating.

It will be appreciated that the method of cathodic deposition of the invention may further comprise rinsing and baking the coated substrate after removal from the coating composition bath.

Electrodeposition of the coating preparations according to the invention may be carried out by any of a number of processes known to those skilled in the art. The deposition may be carried out on all electrically conducting substrates, for example metal, such as steel, copper, aluminum and the like.

In a preferred embodiment, the cathodic electrodeposition method of the invention will be used to provide a first layer of electrodeposited coating on a metallic substrate.

A pigmented resin coating and optionally a clearcoat layer may be applied over primer layers, including electrocoat primer layers. In automotive applications, the pigmented resin layer is often called a basecoat or pigmented basecoat. The resin in the pigmented resin layer can be of a number of resins known in the art. For example, the resin can be an acrylic, a polyurethane, or a polyester. Typical pigmented resin coating formulations are described in U.S. Pat. Nos. 4,791,168, 4,414,357, and 4,546,046, the disclosures of which are incorporated herein by reference. In one preferred embodiment, the resin is an ε-caprolactone-modified acrylic resin, as described in U.S. Pat. No. 4,720,528, the disclosure of which is incorporated herein by reference. The pigmented resin can be cured by any of the known mechanisms and curing agents, such as a melamine polyol reaction (e.g., melamine cure of a hydroxy-functional acrylic resin).

Other pigmented basecoat compositions for such composite coatings are well known in the art, and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. Basecoat polymers are preferably crosslinkable, and thus comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

After an article is coated with the above-described layers, the composition is subjected to conditions so as to cure the coating layers. Although various methods of curing may be used, including curing at ambient conditions, heat-curing is preferred because it has added benefits, such as driving off residual water or solvent from the coating composition. Generally, heat curing is effected by exposing the coated article to elevated temperatures provided primarily by radiative heat sources. Curing temperatures will vary depending on the particular blocking groups used in the cross-linking agents, however they generally range between 90° C. and 200° C., preferably between 121° C. and 162° C., and most preferably between 121° C./250° F. and 141° C./286° F. The curing time will vary depending on the particular components used, and physical parameters such as the thickness of the layers, however, typical curing times range from 15 to 60 minutes.

The invention is further described in the following examples.

EXAMPLE 1

Preparation of a Polymer (A) According to the Invention

Part (i)

Preparation of polymer intermediate (A') and reactive additive (B)

To a 1 liter round bottom 4-neck flask set up with an addition funnel, condenser, temperature probe and mixing shaft was added 333.5 grams (1.5 moles) of isophorone diisocyanate (IPDI), 0.5 grams of dibutyltindilaurate and 152.0 grams of MIBK (methyl isobutyl ketone—urethane grade/dry). A total of 232.1 grams (1.95 moles) of hydroxypropyl carbamate (HPC) was added to the addition funnel. The HPC from the addition funnel was added to the flask at such a rate that the temperature was maintained at 34° C. to 40° C. The temperature was then maintained at 40° C. for three hours and the NCO content was verified by titration to be 682 grams product/eq NCO. (539 g solid/eq NCO). The final product was 78.8% solid content and contained 2 moles of carbamate functional intermediate (A') to 1 mole of "in-situ" generated carbamate reactive intermediate (B).

Part (ii)

Preparation of Polymer (A)

To a 3000 ml flask equipped with a mixer, condenser and temperature probe were added 376.0 g diglycidyl ether of bisphenol A (1 mole at EEW=188), 171.0 g bisphenol A (0.75 moles) and 28.8 g xylene. The reaction was heated to 120° C. and 0.5 grams of triphenylphosphine were added. The reaction was exothermic and the temperature was maintained at 150° C. for 1 hour and the weight per epoxy was confirmed to be 1113 solid/eq. epoxy. The batch was cooled from 150° C. to 95° C. by the addition of 100.0 grams of MIBK. At 95C, 342.0 g of the reaction product from Part (i) above was added. The reaction temperature was maintained at 95C for 2 hours and the loss of isocyanate and completion of the graft reaction was confirmed by titration. At 95° C., 72.1 grams of a mixture of 30.7 grams (0.345 moles) of dimethylethanolamine and 41.4 grams of lactic acid (86%) were added. The temperature of the reaction was then maintained at 95° C. for 3 hours. The resin was diluted with 41.5 grams of propylene glycol phenyl ether and 41.5 grams ethylene glycol butyl ether and cooled to 60° C. The resin was 75% solids and had a number average molecular weight (Mw) of 3354 as measured by by gel permeation chromatography. The resin has a carbamate equivalent weight of 950 grams solid resin/equivalent carbamate. The meq Quat/gram NV is 0.390.

EXAMPLE 2

Preparation of a Cathodic Emulsion According to the Invention 500.0 grams of the product of Example 1, Part (ii) described above, 187.5 grams of a butylated melamine resin (Monsanto Resimine 7539), 23.0 grams of ethylene glycol butyl ether, 23.0 grams of propylene glycol phenyl ether and 23.0 grams of a plasticizer (Milliken Synfac 8009/Bisphenol A extended with ethylene oxide) were added to a one gallon vessel. This was mixed until homogenous. 6.0 grams of bismuth octocate catalyst and 1.0 grams of zinc nitrate catalyst were added. A total of 1319 grams deionized water was added in portions with good mixing. The resulting emulsion had a solids content of 20%. Additional deionized water was added to reduced the viscosity and the organic solvent was allowed to strip from the stirred emulsion for one day. After one day, the stripped emulsion had a viscosity of 35 cps and was 27% solids. The pH was 5.0 and the conductivity was 1231 micromhos. The emulsion had a particle size of 0.14 microns. The meq Quat content was 0.45 meq quaternary ammonium sites/gram solid.

EXAMPLE 3

Preparation of a Cathodic Electrocoat Bath Using the Coating Composition of the Invention Part (i)

Preparation of a Grey Pigment Paste

To a tank were added the following materials in order, 2,624.2 parts of deionized water and 1,879.60 parts of a urethane epoxy resin solution prepared in accordance with Example II of U.S. Pat. No. 4,007,154. The materials were mixed for a minimum of ten minutes and the following added under low agitation, 38.50 parts of K-2000 additive, commercially available from Byk-Chemie, 127.20 parts of a black pigment, 217.9 parts of dibutyl tin oxide and 254.2 parts of lead silicate. The mixing speed was increased to high and the paste mixed for a minimum of ten minutes. 90.8 parts of clay-aluminum silicate was-added. High speed mixing was maintained while 4,213 parts of white $TiO_2$ were added. The paste was mixed for a minimum of 45 minutes. Deionized water was added to obtain a viscosity of 75–85 KU.

Part (ii)

Preparation of a Cathodic Electrocoat Bath.

To a gallon vessel were added 2391 grams of principal emulsion of Example 3 above and 150.0 grams of the grey pigment paste from Ex 3, part (i) above. The bath was diluted with 1048 grams DI water. The bath had a pigment/binder ratio of 0.2 and a solids content of 20%. After mixing for 2 hours in an open vessel, the bath had a pH of 5.6 and a conductivity of 1191 micromhos.

EXAMPLE 4

Deposition of Cathodic Electrocoat Coating Composition According to the Invention Using a DC rectifier a 4"×12"steel panels were coated via cathodic electrodeposition in the cathodic electrocoat bath of Example 3. The set voltage was between 96 and 157 volts. The amps were set at 0.8 to 1.0 amps and the deposition time was 2.2 to 2.5 minutes. The bath temperature was 90° F.

Cathode reaction $2H_2O + 2e^- \rightarrow H_2 + 2OH^-$

The panels were baked at temperatures from 260° F. to 320° F. to obtain 0.6 to 0.8 mils dry film build with good results as indicated below.

| Test | Bake (30' @ 285° F.) | Bake (30' @ 300° F.) | Bake (30' @ 320° F.) | Control Bake[1] (30' @ 350° F.) |
|---|---|---|---|---|
| Hardness (Tukon/knoops) | 28 | 27 | 22 | 22 |
| 100 MEK rubs | Pass | Pass | Pass | Pass |
| Direct Impact (20 lbs) | Pass | Pass | Pass | Pass |
| 500 hrs Salt Spray (mm rust creep) | 0.71 | 0.48 | 0.55 | 0.15 |
| 20 cycle SCAB (mm rust creep) | 4.6 | 2.1 | 2.0 | 1.7 |

[1]The control was a cathodic electrocoat composition commercially available from BASF Corporation of Southfield MI as Cathoguard ® 350. The control sample was prepared as indicated above in Example 4.

It can be seen that equivalent properties to the control can be achieved at advantageously lower bakes.

What is claimed is:

1. A resin composition comprising:

(A) a polymer comprising at least one primary carbamate group and one or more quaternary ammonium groups, and (B) a carbamate functional reactive additive which is generated in situ during the production of polymer (A).

2. The resin composition of claim 1 wherein polymer (A) comprises a polymer comprising one or more units of the formula:

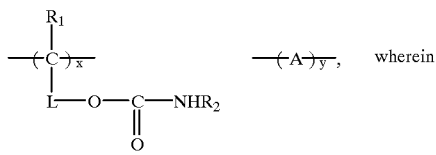

wherein $R_1$ represents H or $CH_3$, $R_2$ represents H, alkyl, or cycloalkyl, L represents a divalent linking group, A represents repeat units comprising at least one repeat unit having a quaternary ammonium group, x represents 10 to 90 weight %, and y represents 90 to 10 weight %, with the proviso that there is at least one repeat unit where $R_2$ is H.

3. The resin composition of claim 1 wherein polymer (A) has a number average molecular weight of from about 2000 to 100,000.

4. The resin composition of claim 3 wherein polymer (A) has a number average molecular weight of from about 3,000 to 30,000.

5. The resin composition of claim 1 having a meq range of from 0.1 to 2.0, based on the total weight of polymer (A) and reactive additive (B).

6. The resin composition of claim 5 wherein polymer (A) has a meq range of from 0.2 to 1.5.

7. The resin composition of claim 1 wherein reactive additive (B) has a number average molecular weight of from 250 to 2000.

8. The resin composition of claim 1 wherein reactive additive (B) has at least two carbamate functional groups.

9. The resin composition of claim 1 wherein components (A) and (B) are the reaction products of a process comprising reacting a polyisocyanate (ai), and a compound (aii) comprising at least one group that is reactive with isocyanate and at least one carbamate group, so as to produce both an intermediate product (A') having at least one carbamate functional group and at least one isocyanate functional group, as well as a carbamate functional reactive additive (B) having no isocyanate functionality, reacting said intermediate product (A') with a compound having at least one epoxy group and at least one isocyanate reactive group, said reaction occurring in the presence of the reactive additive (B) so as to produce a carbamate functional resin having at least one epoxy group, reacting said at least one epoxy group of the carbamate functional resin with a tertiary amine compound in the presence of an acid to provide a carbamate functional resin (A) having one or more quaternary ammonium groups, said reaction occurring in the presence of the reactive additive so as to provide a resin composition comprising (A) a carbamate functional resin having one or more quaternary ammonium groups and (B) a carbamate functional reactive additive.

10. The resin composition of claim 9 wherein the polyisocyanate is a diisocyanate.

11. The resin composition of claim 10 wherein the diisocyanate is isophorone diisocyanate.

12. The resin composition of claim 9 wherein the compound comprising at least one group that is reactive with isocyanate and at least one carbamate group is a hydroxyalkyl carbamate.

13. The resin composition of claim 12 is hydroxypropylcarbamate.

14. The resin composition of claim 9 wherein said compound having at least one epoxy group and at least one isocyanate reactive group is the reaction product of a liquid epoxy and a compound comprising at least two hydroxyl groups.

15. The resin composition of claim 14 wherein said compound having at least one epoxy group and at least one isocyanate reactive group is the reaction product of the diglycidyl ether of bisphenol A and bisphenol A.

16. A method of making a resin composition comprising (A) a polymer having at least one primary carbamate group and one or more quaternary ammonium groups and (B) a reactive additive, the method comprising reacting a polyisocyanate (ai), and a compound (aii) comprising at least one group that is reactive with isocyanate and at least one carbamate group, so as to produce both an intermediate product (A') having at least one carbamate functional group and at least one isocyanate functional group, and a carbamate functional reactive additive (B) having no isocyanate functionality, reacting said intermediate product (A') with a compound having at least one epoxy group and at least one isocyanate reactive group, said reaction occuring in the presence of the reactive additive so as to produce a carbamate functional resin having at least one epoxy group, reacting said at least one epoxy group with a tertiary amine compound in the presence of an acid to provide a carbamate functional resin (A) having one or more quaternary ammonium groups, said reaction occurring in the presence of the reactive additive to provide a resin composition comprising (A) an carbarnate functional resin having one or more quaternary ammonium groups and (B) a carbamate functional reactive additive.

17. The resin composition obtained by the method of claim 16.

18. A cathodic electrocoat coating composition comprising an aqueous dispersion of a resin composition comprising:
   (A) a polymer comprising at least one primary carbamate group and one or more quaternary ammonium groups, and
   (B) a carbamate functional reactive diluent which is generated in situ during the production of polymer (A).

19. The cathodic electrocoat coating composition of claim 18 further comprising
   (C) a curing agent having a plurality of functional groups reactive with the functional groups of polymer (A).

20. The cathodic electrocoat coating composition of claim 19 wherein (C) is free of isocyanate functionality.

21. The cathodic electrocoat coating composition of claim 20 wherein (C) is an aminoplast resin.

\* \* \* \* \*